Dec. 19, 1944.   S. G. JOHANSSON   2,365,273
COMBINED TESTING AND WORKING FIXTURE
Filed Sept. 25, 1943   2 Sheets-Sheet 1

INVENTOR
S.G. JOHANSSON
BY
E.R. Nowlan
ATTORNEY

Dec. 19, 1944.  S. G. JOHANSSON  2,365,273
COMBINED TESTING AND WORKING FIXTURE
Filed Sept. 25, 1943   2 Sheets-Sheet 2
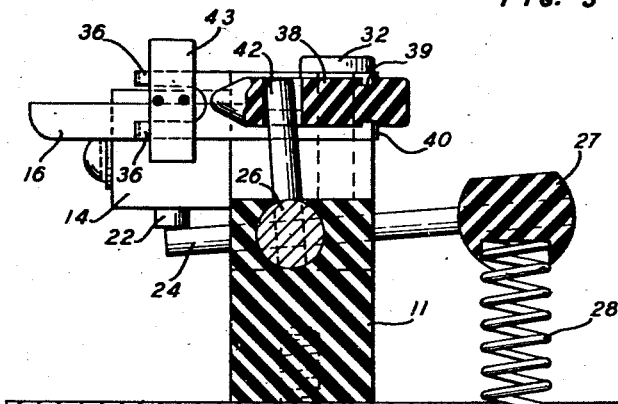
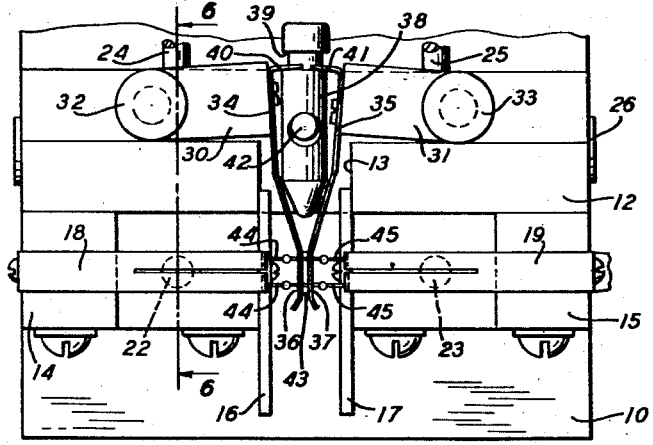
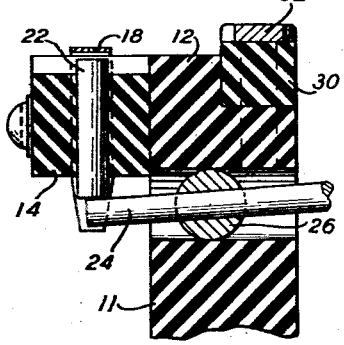
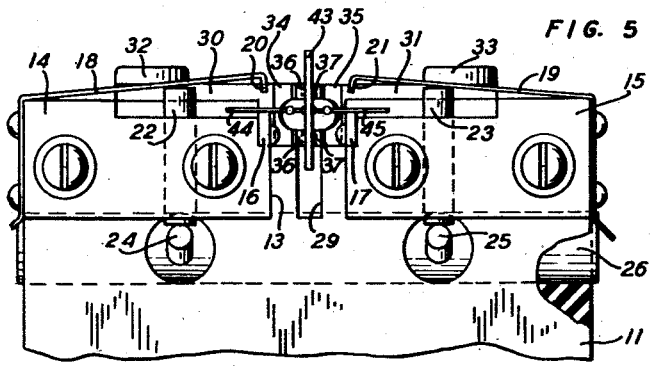
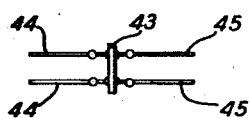
INVENTOR
S.G. JOHANSSON
BY
E.R. Nowlan
ATTORNEY Patented Dec. 19, 1944

2,365,273

UNITED STATES PATENT OFFICE 2,365,273

COMBINED TESTING AND WORKING FIXTURE

Sven G. Johansson, Cranford, N. J., assignor to Western Electric Company, Incorporated, New York, N. Y., a corporation of New York Application September 25, 1943, Serial No. 503,824

4 Claims. (Cl. 171—327)

This invention relates to a combined testing and working fixture, and more particularly to a fixture for holding a quartz crystal in two different alternative manners while being electrically tested and while being mechanically modified.

A "quartz crystal" or "crystal", tout court, in the parlance of the high frequency electrical arts is a small slab or slice of crystalline quartz, usually having one or more metallic coatings on each of its two broad faces and with one or more metal wires butt welded or soldered to these coatings at right angles to the broad faces to serve both as mechanical supports and as electrical connections. Certain electrical properties of such a "crystal" are directly related to the dimensions of the crystalline slab itself. Hence in the manufacture of crystals, after a crystal as described has been assembled, it is often necessary to apply a high frequency alternating potential across the coatings on the two sides to measure an electrical property of the crystal, and then diminish mechanically one of the crystal dimensions, preferably usually by grinding down one of the edges of the slab, to bring the manifested value of the property in question to a precise predetermined value.

An object of the present invention is to provide a simple, reliable and easily operable device or fixture in which a crystal can be held in either of two alternative manners, in one of which a testing potential may be applied thereto, and in the other of which the crystal is safely and mechanically held to be subjected to a grinding or honing operation.

With the above and other objects in view, the invention may be embodied in a fixture for holding a crystal and comprising movable electrically conductive means to engage the terminal wires of the crystal for electrically testing the crystal, movable mechanical means to engage the coated surface of the crystal to hold the crystal securely for grinding or honing, and actuating means movable to actuate the said conductive means and the said mechanical means alternatively.

Other objects and features of the invention will appear from the following detailed description of one embodiment thereof, taken in connection with the accompanying drawings in which the same reference numerals are applied to identical parts in the several figures and in which Fig. 1 is a plan view of a device constructed in accordance with the invention;

Fig. 3 is a section on the line 3—3 of Fig. 1;

Fig. 4 is a partial view similar to Fig. 1 with parts in another position;

Fig. 5 is a partial view similar to Fig. 2 with parts in another position;

Fig. 6 is a section on the line 6—6 of Fig. 4; and

Fig. 7 is a detached plan view of the crystal illustrated in Fig. 1.

Figure 1:
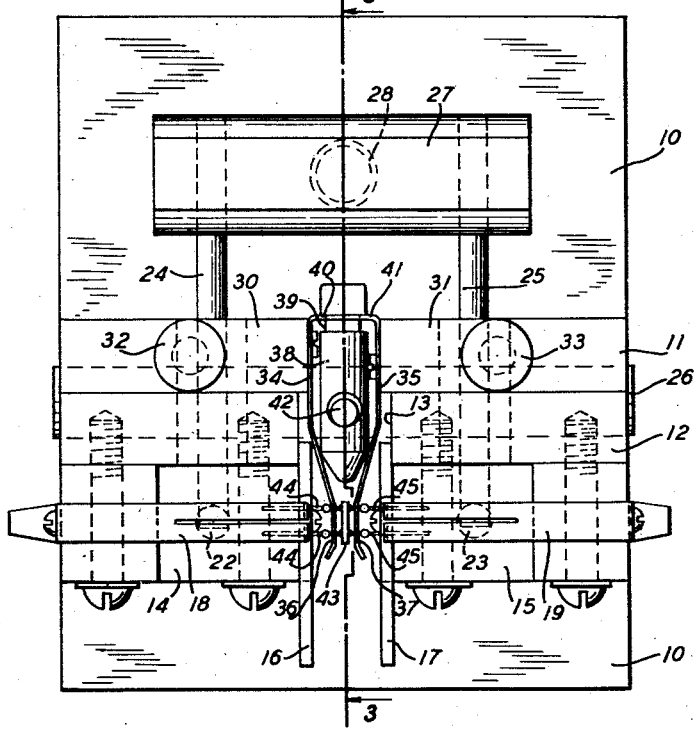

The embodiment of the invention herein disclosed comprises a flat slab-like base 10 of metal on which is secured a transverse upright support 11 of insulating material formed on the forward half of its upper face with an upstanding flange 12 having a central cross slot 13. Blocks 14 and 15 of insulating material are secured on the front face of the flange 12, spaced apart to be flush with the sides of the slot 13. Elongated supports 16 and 17 of sheet metal are secured against the opposing spaced faces of the blocks 14 and 15 respectively and have their upper edge faces a little above and parallel to the upper faces of the blocks. Spring contact members 18 and 19 of metal and formed as shown are mounted respectively on the blocks 14 and 15 to have their downturned free ends 20 and 21 elastically pressed down against the top edge faces of the supports 16 and 17 respectively. Plungers 22 and 23, respectively, of insulating material and housed vertically in suitable bores in the support 14, are abuttable against the under sides of the spring contacts 18 and 19 to lift the contact points 20 and 21 up and away from the supports 16 and 17. These plungers are actuable by means of levers 24 and 25 respectively mounted in a shaft 26 journalled in the support 11. The levers 24 and 25 are held in rigid relation to each other by the shaft and also by a common actuating handle 27. A compression spring 28 interposed between the handle 27 and the base 10 serves to hold the handle up and thus leave the plungers 22 and 23 in inoperative position until the handle is depressed.

On the rear of the top face of the support 11 is a pair of blocks 30 and 31 of insulating material, pivotable about vertical pins 32 and 33 in the support 11. The mutually opposed ends of these blocks are spaced apart a distance somewhat smaller than the width of the slot 13. Two members, 34 and 35 respectively, are secured on the mutually opposed faces of the blocks 30 and 31. The members 34 and 35 are formed of elastic sheet metal, as shown, to extend forward and to present, between the contact points 20 and 21, a pair of vertical, parallel gripping jaws 36 and 37, each bifurcate at its outer end as best shown in Fig. 3. Between the rear ends of the members 34 and 35 there lies loosely a horizontal plunger 38 of generally cylindrical shape, but pointed at the forward end merely to clear the converging forward parts of the members 34 and 35, and having a broad circumferential groove 39 near its rear end. This plunger 38 normally rests at its forward end on the top edges of a narrow slot 29 in the support 11, while its rear end is held, at the groove 39, between the correspondingly shaped and inturned ends 40 and 41 of the members 34 and 35. An upright lever 42 on the shaft 26 enters a somewhat larger bore in the body of the plunger 38.

The article for use in the manipulation of which this particular device is constructed, is shown detached and in plan in Fig. 7. It comprises a small, thin, rectangular wafer, sheet or slice 43 of crystalline quartz, coated on each side with metal and having a pair of combination support and connector wires 44, 44 and 45, 45 secured to the coatings and extending out at right angles from the coated faces.

In operation, the levers 24 and 25 are actuated by pressing the handle 27 down until the plungers 22 and 23 have lifted the contact points 20 and 21 from the supports 16 and 17, but the plunger 38, owing to the breadth of the groove 39, has not yet begun to move the ends 40 and 41 of the members 34 and 35. The jaws 36 and 37 are then open as in Figs. 1 and 2, while there is also room to slide the wires 44 and 45 between the contacts 20 and 21 above them and the supports 16 and 17 and into the bifurcate ends of the jaws. If the handle be then released, the contacts 20 and 21 close down on the wires and the state of affairs is that shown in Figs. 1 and 2. A testing current or potential may then be applied to the crystal via the members 18 and 19. If it then be found that the vertical length of the quartz slice needs to be reduced, the handle is fully depressed.

The parts are so proportioned and related, that, as the handle is pressed down from its extreme upward position to its extreme downward position, the following occur in the stated manner. First the contacts 20 and 21 are lifted from the wires 44 and 45, leaving the crystal suspended by the wires on the supports 16 and 17, and disconnecting the crystal entirely from the testing circuit, so that even if this circuit be closed elsewhere, no current can pass to or through the crystal. At this stage also, the crystal may be removed and replaced by another. Next, while the contacts 20 and 21 are idly raised still further, the plunger 38 begins to press the ends 40 and 41 of the members 34 and 35 backward, thus causing the pivotable blocks 30 and 31 to pivot backward and press the jaws 36 and 37 against the quartz slice from opposite sides. A diamond hone or other grinding tool may then be used, while the handle 27 is held depressed, to take off a portion of the top edge of the quartz. This stage is illustrated in Figs. 4 and 5.

Figure 2:
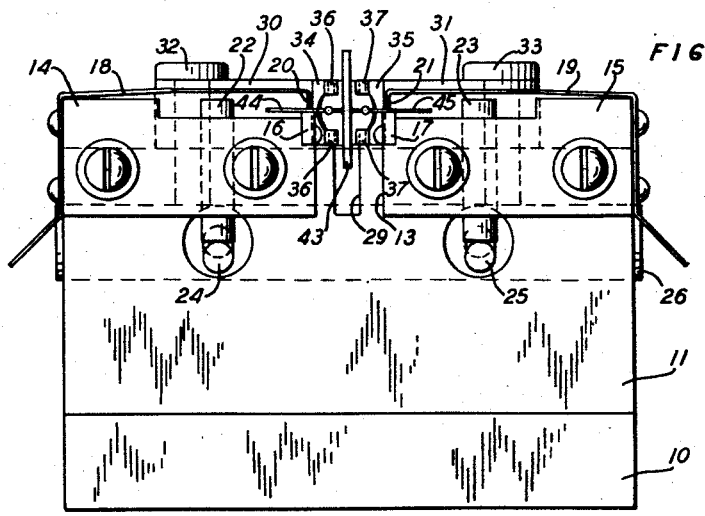
Fig. 2 is a front elevation thereof.

Releasing the handle, the spring 28 returns the apparatus to the testing condition or stage of Figs. 1 and 2. Thus with the handle 27 up, the crystal may be tested; with the handle half way down, the crystal may be inserted or removed; and, with the handle in its lowest position, the crystal may be adjusted.

What is claimed is:

1. A testing and adjusting fixture for quartz crystals and comprising movable contact means actuable to make contact with the terminal wires of a crystal, movable jaw means actuable to be pressed against opposite faces of the quartz slice of the crystal to grip and hold the crystal firmly, and common means to actuate the two said means alternatively.

2. A testing and adjusting fixture for quartz crystals and comprising a pair of supporting members to receive the terminal wires of a crystal thereon and thereby support the crystal, a pair of electrical contact members to press against the wires on the supporting members and thereby make contact therewith, a pair of jaw members actuable to press the quartz slice of the crystal therebetween to thereby hold the crystal firmly, and common means movable to lift the contact members from the wires and press the jaws against the quartz slice.

3. A testing and adjusting fixture for quartz crystals and comprising a pair of supporting members to receive the terminal wires of a crystal thereon and thereby support the crystal, a pair of electrical contact members to press against the wires on the supporting members and thereby make contact therewith, a pair of jaw members actuable to press the quartz slice of the crystal therebetween to thereby hold the crystal firmly, and common means movable to one position to lift the contact members from the wires and to another position and press the jaws against the quartz slice while still holding the contact members lifted from the wires.

4. A testing and adjusting fixture for crystals and comprising a pair of supporting members to receive the terminal wires of a crystal thereon and thereby support the crystal, a pair of electrical spring contact members to press against the wires on the supporting members and thereby make contact therewith, a pair of levers to lift the contact members from the wires, a pair of jaw members actuable to press the quartz slice of the crystal therebetween to thereby hold the crystal firmly, a lever to actuate the jaw members, and a common member to actuate the three levers.

SVEN G. JOHANSSON.